(12) United States Patent
Mangattur et al.

(10) Patent No.: US 8,896,147 B2
(45) Date of Patent: Nov. 25, 2014

(54) LOW POWER IMPLEMENTATION TO ALLOW FOR HIGH POTENTIAL RAILS TO COME UP IN ANY ORDER

(75) Inventors: Jason J. Mangattur, Thornhill (CA); Richard W. Fung, Thornhill (CA); Marcus Ng, East York (CA)

(73) Assignee: ATI Technologies ULC, Markham, Ontario (CA)

( * ) Notice: Subject to any disclaimer, the term of this patent is extended or adjusted under 35 U.S.C. 154(b) by 530 days.

(21) Appl. No.: 13/336,503

(22) Filed: Dec. 23, 2011

(65) Prior Publication Data

US 2013/0162044 A1   Jun. 27, 2013

(51) Int. Cl.
*H02J 1/10* (2006.01)

(52) U.S. Cl.
USPC ............................................. 307/18

(58) Field of Classification Search
USPC ............................................. 307/18
See application file for complete search history.

(56) References Cited

U.S. PATENT DOCUMENTS

2008/0258555 A1* 10/2008 Joshi et al. ............... 307/18

* cited by examiner

*Primary Examiner* — Robert L. Deberadinis
(74) *Attorney, Agent, or Firm* — Volpe and Koenig, P.C.

(57) ABSTRACT

A low power biasing circuit for powering up split-rail electronic circuits includes an intermediate voltage generator at each pad which is supplied by a temporary supply voltage to generate a temporary intermediate voltage only when a power signal indicates that all external voltage rails are not safe, thereby reducing power consumption.

20 Claims, 4 Drawing Sheets

US 8,896,147 B2

LOW POWER IMPLEMENTATION TO ALLOW FOR HIGH POTENTIAL RAILS TO COME UP IN ANY ORDER

BACKGROUND OF THE INVENTION

1. Field of the Invention

The present invention relates in general to the field of electronic circuits. In one aspect, the present invention relates to a method and apparatus for biasing split power supply based circuits in response to power up conditions.

2. Description of the Related Art

In many integrated electronic circuits, multiple different voltage power supply levels are provided for different circuit portions, such as core logic, analog circuits and input output interfaces, and any other suitable circuits. With multi-voltage or "split-rail" circuits, each circuit portion may have different power levels, high drive voltage levels, and maximum allowable voltage levels, depending on the type of transistor technology and design used at each circuit portion. The use of different types of transistors and power supply levels can create design challenges since transistors can be damaged by excessive gate-source voltages (Vgs) that are created when power supply voltages are improperly supplied to the transistors. Accordingly, a reliability challenge for designing integrated circuits is to power up the split-rail circuit portions with a power-up circuit or sequence that keeps the gate-source voltage Vgs below a maximum allowable gate-source voltage Vgs-max.

Accordingly, a need exists for an improved power up circuit and methodology which addresses various problems in the art that have been discovered by the above-named inventor where various limitations and disadvantages of conventional solutions and technologies will become apparent to one of skill in the art after reviewing the remainder of the present application with reference to the drawings and detailed description which follow, though it should be understood that this description of the related art section is not intended to serve as an admission that the described subject matter is prior art.

SUMMARY OF EMBODIMENTS OF THE INVENTION

Broadly speaking, the present invention provides a method and apparatus for powering electronic circuits using more than one supply voltage by distributing a temporary supply voltage (e.g., 3.3V) to one or more intermediate voltage generators at one or more pads so that each intermediate voltage generator provides a temporary intermediate voltage (e.g., 1.8V) for use until a power signal (e.g., PWROK) is provided indicating that an external intermediate voltage is available, at which time the intermediate voltage generator(s) are powered down. In selected example embodiments, there is provided a method for powering an electronic circuit using a plurality of intermediate voltage generators. A first intermediate voltage generator is supplied by an external high supply voltage (3.3V rail), and generates an internal intermediate voltage (e.g., internal 1.8V) which is supplied to a pair of multiplexers. Under control of the power signal, each multiplexer selectively passes the internal intermediate voltage or an external voltage to control cascaded transistors which generate a temporary supply voltage (e.g., 3.3V) which is distributed to one or more pads. At each pad, the temporary supply voltage is used to supply a second intermediate voltage generator for generating a temporary internal intermediate voltage (e.g., internal 1.8V) which is supplied along with an external intermediate voltage (e.g., external 1.8V) to a multiplexer circuit. Under control of the power signal, the multiplexer circuit selectively passes the temporary internal intermediate voltage and external intermediate voltage as an intermediate voltage (e.g., LV18) for use in powering intermediate voltage circuits at the pad, and simultaneously disables the second intermediate voltage generator once the external intermediate voltage is safe to reduce power consumption.

BRIEF DESCRIPTION OF THE DRAWINGS

The present invention may be better understood, and its numerous objects, features and advantages made apparent to those skilled in the art by referencing the accompanying drawings. The use of the same reference number throughout the several. figures designates a like or similar element.

DETAILED DESCRIPTION

A low power biasing circuit and associated method of operation are described for powering electronic circuits that include multiple supply voltage rails that can conic up in any order. In selected embodiments, the biasing circuit includes an intermediate voltage generator at each pad which is supplied by a temporary supply voltage to generate a temporary intermediate voltage. The temporary intermediate voltage is multiplexed with an external intermediate voltage under control of a power signal indication that all external voltage rails are safe so that either the temporary intermediate voltage or the external intermediate voltage is output. By supplying the intermediate voltage generators at each pad with a temporary supply voltage that is removed when the external voltage rails are safe, power consumption is reduced at the intermediate voltage generators.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagram depictions rather than in detail in order to avoid limiting or obscuring the present invention.

Figure 1:
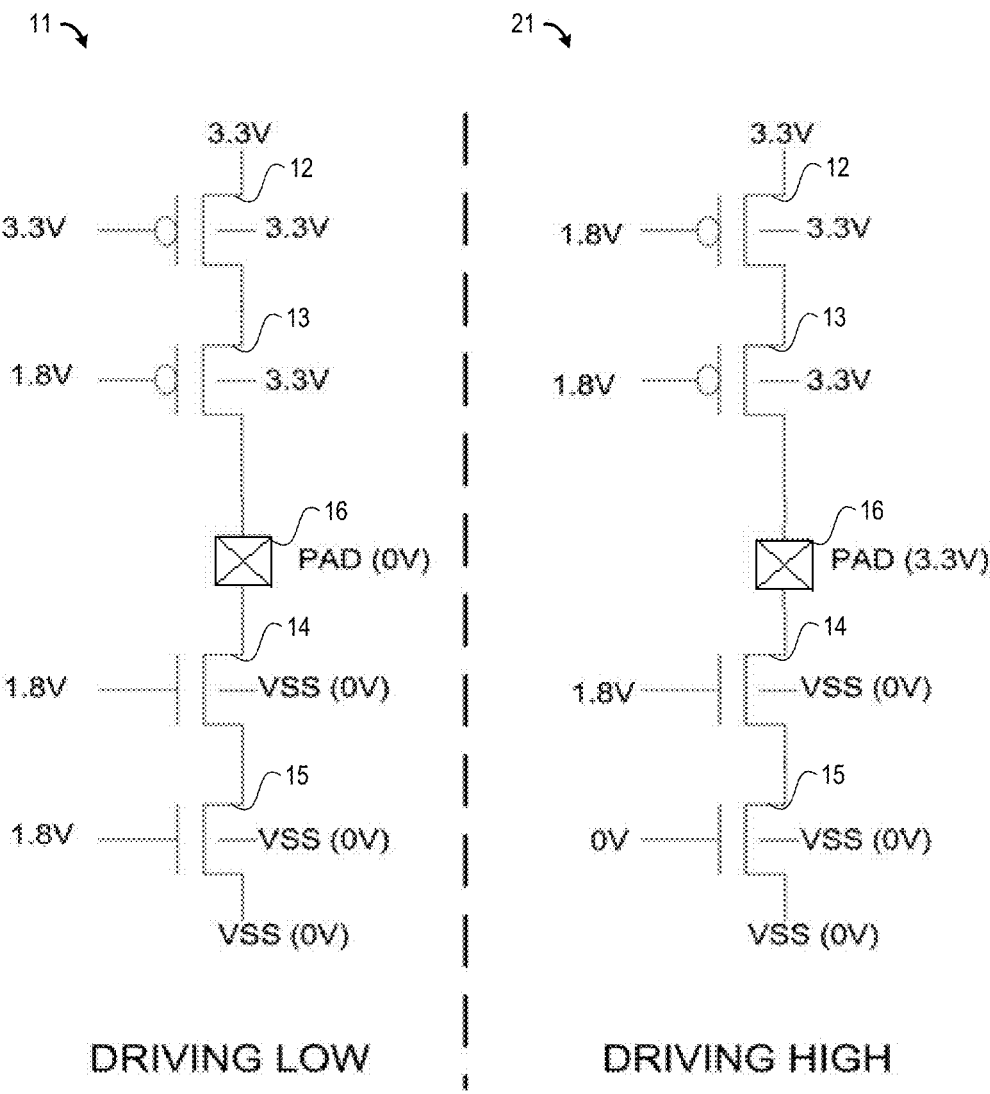
FIG. 1 shows a circuit diagram of cascoded transistors connected in sequence between the first and second reference voltage rails with intermediate voltages selectively applied to generate 3.3V signals at a pad.

To provide a contextual understanding for selected embodiments of the present invention, reference is now made to FIG. 1 which illustrates a circuit diagram of cascoded transistors 12-16 under two different signal configurations 11, 21. In each case, the transistors 12-15 are connected in sequence between the first and second reference voltage rails (0V and 3.3V) with intermediate voltages selectively applied to generate 0V and 3.3V signals at the pad 16 without exceeding Vgs-max (e.g., Vgs-max=2V). The cascoded transistors include first and second PMOS transistors 12-13 connected in sequence between the 3.3V rail and pad 16, and first and second NMOS transistors 14-15 connected in sequence between the pad 16 and the 0V rail. In the first signal configuration 11 shown for driving the pad 16 "LOW" (e.g., 0V), the PMOS transistors 12-13 are turned "OFF" by the respective application of gate voltages 3.3V, 1.8V to disconnect the 3.3V supply and pad 16, while the NMOS transistors 14-15 are turned "ON" by their respective gate voltages (L.8V, 1.8V) to connect the pad 16 to ground or Vss. Conversely, the second signal configuration 21 shows the pad 16 being driven "HIGH" (e.g, 3.3V), with the PMOS transistors 12-13 turned "ON" by their respective gate voltages (1.8V, 1.8V) to connect the 3.3V supply and pad 16, and with the NMOS transistors 14-15 turned "OFF" by the respective application of gate voltages 1.8V, 0V to disconnect the pad 16 from ground or Vss. With conventional approaches for satisfying the Vgs-max requirement at power up, the 1.8V power supply rail would be sequenced to come up before the 3.3V power rail.

Figure 2:
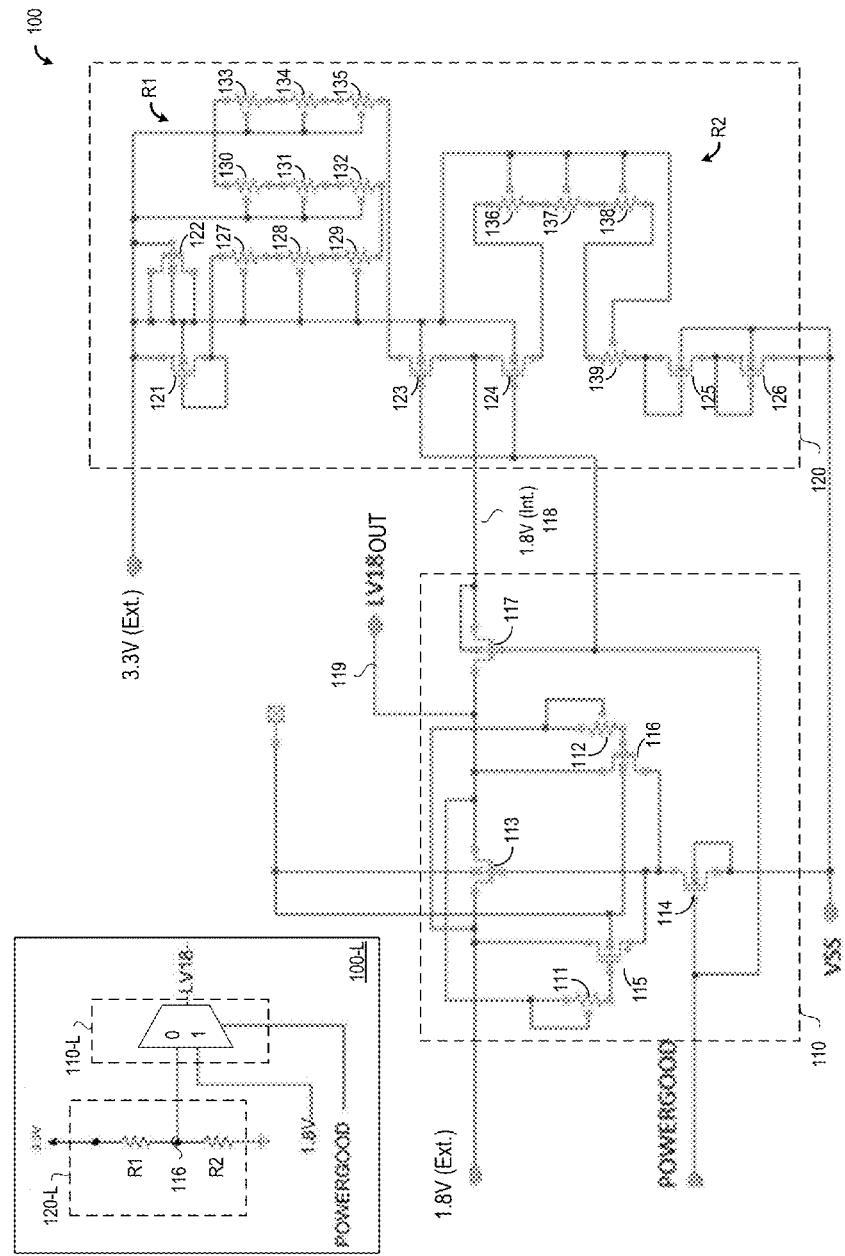
FIG. 2 shows a circuit and logic diagram of an intermediate voltage generator which uses a multiplexer to selectively output an internal voltage or external voltage under control of a power signal.

In order to avoid the power sequencing requirement, an intermediate voltage generator may be included at each pad which generates an internal 1.8V potential from the 3.3V supply rail. With this arrangement, the internal or locally generated potential is used everywhere in the design where Vgs-max requirement could be violated until all power supplies were determined to be up and safe to use. Referring now to FIG. 2, there is shown a circuit diagram of an example intermediate voltage generator 100 which uses a multiplexer 110 to selectively output an internal voltage (provided by a voltage divider circuit 120) or external voltage (provided from an external voltage rail) under control of a power signal (POWERGOOD). FIG. 2 also shows a corresponding logic diagram of the intermediate voltage generator 100-L in which the multiplexer 110-L selectively outputs an internal voltage (provided by a voltage divider circuit 120-L) or external voltage (provided from an external voltage rail) under control of a power signal (POWERGOOD).

In the illustrated voltage generator 100, the voltage divider 120 may be implemented as a resistor divider network in which a first plurality of series-connected resistors 127-135 (collectively forming resistor R1) is connected between the external supply voltage rail (e.g., 3.3V) and a shared node 118 via pull-up transistors 121-122 and connection transistor 123. In addition, a second plurality of series-connected resistors 136-139 (collectively forming resistor R2) is connected between the shared node 118 and external ground voltage rail (e.g., 0V) via connection transistor 124 and pull-down transistors 125-126. When the power signal indicates that the external power supplies are not yet safe (e.g., POWERGOOD=0V), the intermediate voltage from the voltage divider 120 is connected to the multiplexer output 119. In particular, the power signal is applied to the PMOS connection transistor 117 to connect the locally generated potential at the shared node 118 to the multiplexer output 119 to generate LV18 OUT. However, when the power signal indicates that the external power supplies are safe (e.g., POWERGOOD=1V), the voltage divider 120 is disconnected from the multiplexer output 119 by turning OFF the PMOS connection transistor 117. Simultaneously, the power signal is applied to the NMOS transistor 114 which turns ON the PMOS connection transistor 113 to connect the external intermediate potential to the multiplexer output 119 to generate LV18 OUT. Transistors 115 and 116 are used to pull the gate of transistor 113 high (thus turning it off) if either the external 1.8V supply or LV18 OUT are 0V. Resistors 111 and 112 provide ESD protection to transistors 115 and 116, respectively.

With the depicted voltage generator 100, the signal LV18 OUT 119 is generated as the internal 1.8V potential at node 118 from the voltage divider 120 when the POWERGOOD signal indicates that all power supplies are not safe. On the other hand, when the POWERGOOD signal indicates that all powers are safe, the signal LV18 OUT 119 is generated from the external 1.8V supply delivered to the generator 100. In either case, the voltage divider 120 continues to consume current or power if connected to a 3.3 power rail. This power consumption can be a significant percentage of overall power consumption if the voltage regulator 100 is replicated across multiple circuit areas.

Figure 3:
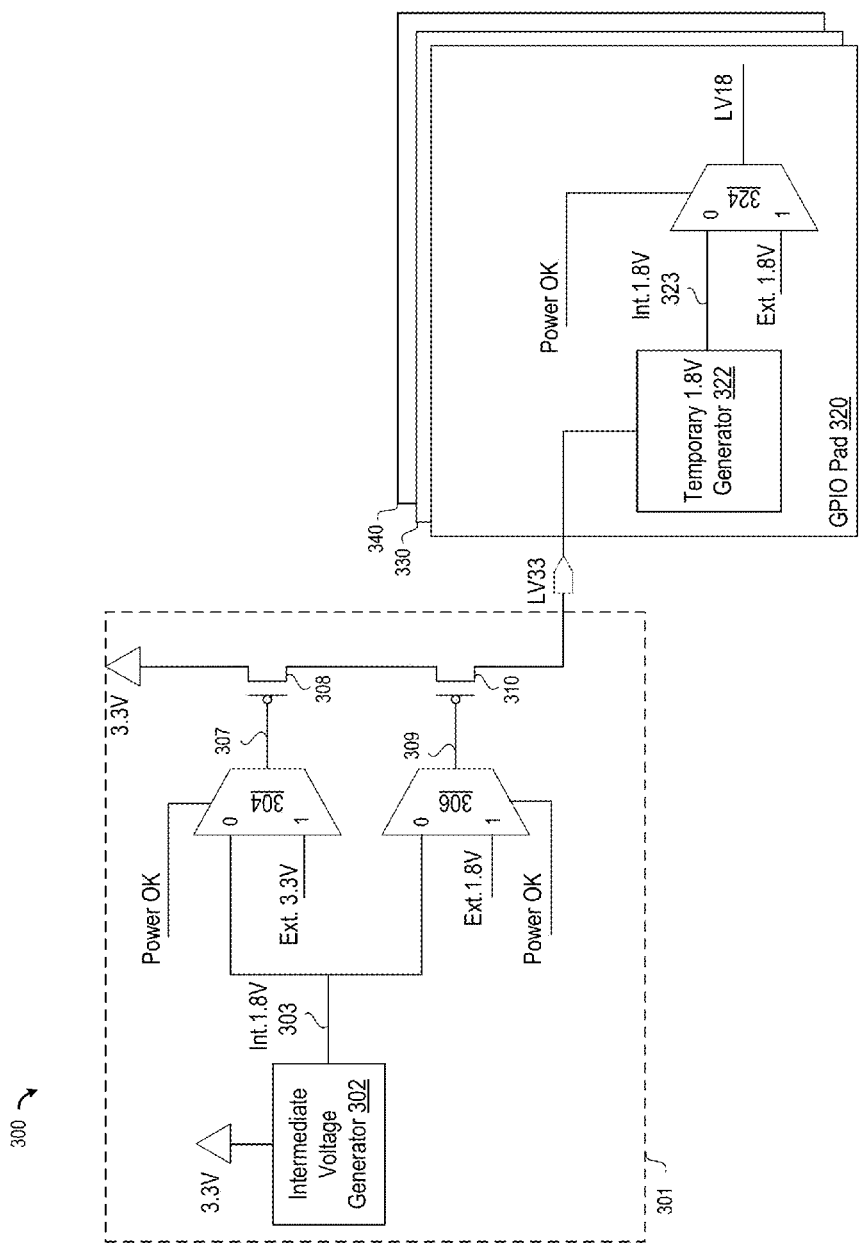
FIG. 3 shows a circuit block diagram of a power up biasing circuit in accordance with selected embodiments of the present invention.

In order to reduce the current consumption, there is disclosed herein a low power biasing circuit which provides automated analog detection of power state and a power switchover mechanism in which the unused local voltage generation circuit is powered down when not being used. To illustrated selected embodiments of the power biasing circuit, reference is now made to FIG. 3 which shows a circuit block diagram of a power up biasing circuit 300 which uses plurality of temporary voltage generators to generate an intermediate voltage (e.g., LV18) at a pad (e.g., GPIO pad 320), A first temporary voltage generator 301 uses a first intermediate voltage generator 302 to generate an intermediate voltage 303 which is selectively multiplexed to a cascade pass-gate 308, 310 to generate a temporary supply voltage (e.g., LV33). The temporary supply voltage is then used to power a second intermediate voltage generator 322 which generates a temporary intermediate voltage (e.g., internal 1.8V) which is multiplexed with an external intermediate voltage (e.g. external 1.8V) to generate an intermediate voltage (e.g., LV18).

Referring to the first temporary voltage generator 301, the first intermediate voltage generator 302 is supplied by an external high supply voltage (e.g., 3.3V rail), and generates an internal intermediate voltage 303 (e.g., internal 1.8V) which is supplied as separate inputs to a pair of multiplexers 304, 306. While any desired voltage generation circuit may be used to generate the internal intermediate voltage, a voltage divider may be implemented as a resistor divider network connected between the external high supply voltage rail and a ground voltage rail to generate an intermediate 1.8V voltage at an output node of the resistor divider network. By virtue of being powered by the 3.3V power rail, the first intermediate voltage generator 302 may continuously consume power, but as explained hereinbelow, the first intermediate voltage generator 302 is shared by multiple circuit areas, thereby reducing the power consumption as compared to having an intermediate voltage generator at each circuit area.

Under control of the power signal (e.g., PowerOK), each multiplexer 304, 306 selectively passes the internal intermediate voltage or an external voltage to control cascoded transistors 308, 310 which generate a temporary supply voltage (e.g., LV33) which is distributed to one or more pads. While a variety of multiplexer circuit designs may be used, the multiplexers 304, 306 may each be implemented substantially as set forth with the multiplexer 110 shown in FIG. 2, except that the external 1.8V rail connection in multiplexer 304 is replaced with an external 3.3V rail connection, Whichever multiplexer circuit design is used, the first multiplexer 304 receives the internal intermediate voltage (Int. 1.8V) at input "0" and receives the external supply voltage (Ext. 3.3V) at input "1," while the second multiplexer 306 receives the internal intermediate voltage Ont. 1.8V) at input "1" and receives the external intermediate voltage (Ext. 1.8V) at input "0." When the power signal logic state indicates that the external power supplies are not yet safe (e.g., PowerOK=logic–0), the multiplexer outputs 307, 309 respectively convey 1.8V signals to the gates of cascoded transistors 308, 310 so that they are turned "ON" to connect the 3.3V supply and pad LV33. However, when the power signal logic state indicates that the external power supplies are safe (e.g., PowerOK=logic–1) the multiplexer outputs 307, 309 respectively convey the external 3.3 and 1.8V signals to the gates of caseoded transistors 308, 310 to disconnect the 3.3V supply and pad LV33. In particular, the multiplexer 306 is controlled by the PowerOK signal to either use the internal 1.8V or the external 1.8V to gate the PMOS transistor 310, and the multiplexer 304 uses the PowerOK signal to control the connection path between the external 3.3V rail connection and the pad LV33. Therefore, the LV33 pad is tied to the external 3.3V rail connection when the PowerOK signal is low, and will be high impedance when the PowerOK signal is high through analog detection of the 1.8V supply, in this way, a temporary supply voltage LV33 is generated which turns OFF when the external power supplies are safe.

At each pad (e.g., GPIO pad 320), the temporary supply voltage LV33 is used to supply the temporary intermediate voltage generator 322 for generating an internal intermediate voltage 323 (e.g., internal 1.8V) which is supplied along with an external intermediate voltage (external 1.8V) to a multiplexer circuit 324. Under control of the power signal (PowerOK), the multiplexer circuit 324 outputs an intermediate voltage LV18 by selectively passing the internal intermediate voltage and external intermediate voltage for use in powering intermediate voltage circuits at the pad. While a variety of circuit designs may be used, the temporary intermediate voltage generator 322 and multiplexer 324 may be implemented substantially as set forth with the voltage divider circuit 120 and multiplexer 110 shown in FIG. 2, except that instead of having the voltage divider powered by the 3.3V rail, it is instead powered by the temporary supply voltage LV33.

In operation, the temporary voltage generator 301 generates a temporary 3.3V supply voltage (LV33) from the 3.3V power supply rail by multiplexing an intermediate internal voltage 303 with a pair of external rail voltages (external 3.3V and external 1.8V) to control a cascoded pass-gate 308, 310 so that the temporary 3.3V supply voltage is HIGH when the external rails are not ready, and is LOW when the external rails are safe. The temporary 3.3V supply voltage (LV33) is distributed to each 3.3V I/O pad (e.g., GPIO pad 320) for use in powering a temporary intermediate voltage generator 322 to generate an internal 1.8V intermediate voltage 323, Under control of a power signal (e.g., PowerOK) which indicates that both the external 1.8V and 3.3V are safe to use, a multiplexer 324 will generate an output signal LV18 as either the internal 1.8V intermediate voltage 323 or the external 1.8V voltage. As a result, the output signal LUIS is safe and reliable to use with the external 3.3V in powering circuits at the pad. However, once the power signal is asserted, the temporary intermediate voltage generator (e.g., 322) no longer consumes current from the external 3.3V rail connection since the cascoded pass-gate 308, 310 disables the temporary supply voltage LV33. Therefore the architecture of the power up biasing circuit 300 allows external powers to come up in any order while minimizing power consumption.

Figure 4:
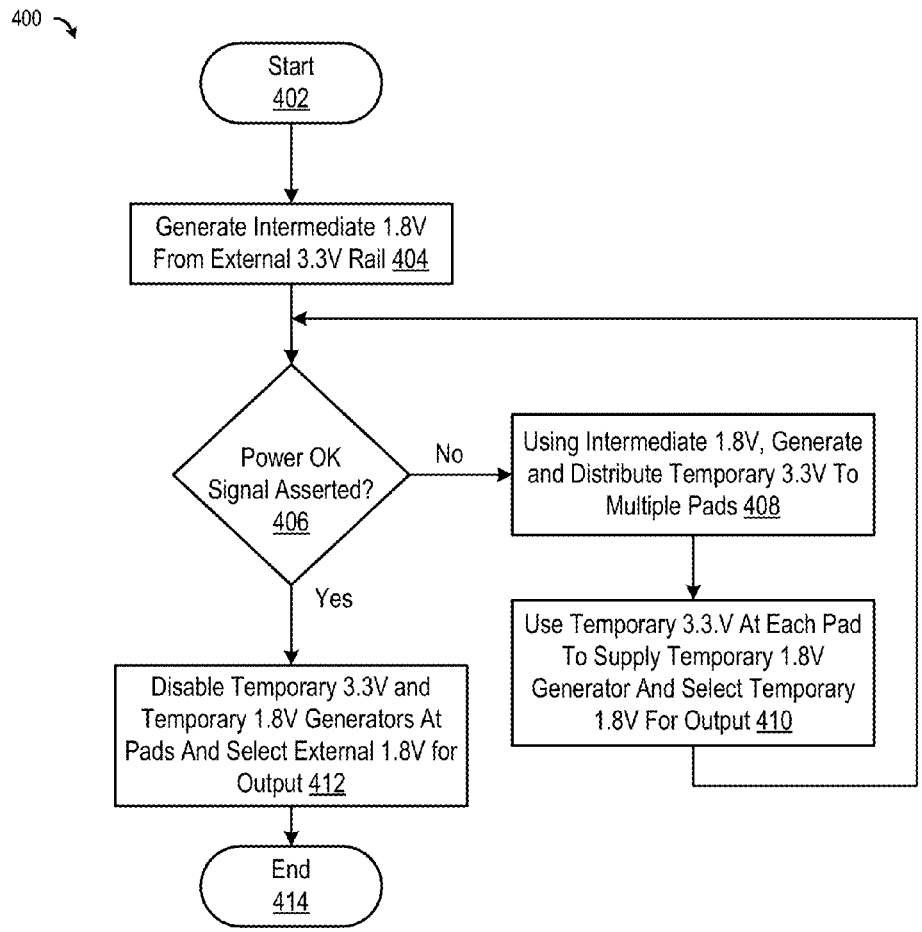
FIG. 4 depicts a process flow sequence for implementing selected embodiments of the present invention.

FIG. 4 depicts a process flow sequence 400 for powering up a split rail circuit implementing selected embodiments of the present invention. After the method begins at step 402, an intermediate voltage (e.g., internal 1.8V) is generated from an external supply voltage external 3.3V rail) at step 404. The intermediate voltage may be generated by a first intermediate voltage generator which is powered by the external 3.3V rail, and generates an internal 1.8V voltage.

At step 406, it is determined if the external power rails are powered up and safe to use. If the power safe signal (Power OK) is not asserted (negative outcome to decision 406), this indicates that the external rails are not safe. In this case, the intermediate voltage is used at step 408 to generate and distribute a temporary supply voltage (e.g., LV33) to multiple circuit areas (e.g., GPIO pad) which require both high and intermediate supply voltages. In selected embodiments, a temporary voltage generator is used to generate the temporary 3.3V supply voltage from the 3.3V power supply rail by multiplexing the intermediate voltage generated at step 404 with a pair of external rail voltages (external 3.3V and external 1.8V) to control a cascoded pass-gate so that the temporary supply voltage is HIGH when the external rails are not ready, and is LOW when the external rails are safe. At step 410, the temporary supply voltage (LV33) is used at each pad to supply a temporary intermediate voltage generator for generating an intermediate output voltage (LV18). selected embodiments, a temporary 1.8V generator includes a voltage divider network which is powered by the temporary supply voltage to generate a temporary intermediate voltage (internal 1.8V) which is multiplexed with an external intermediate voltage (external 1.8V) under control of the power safe signal to output an intermediate output voltage (LV18). For so long as the power safe signal indicates that the external rails are not safe or powered up, the multiplexer selects the temporary intermediate voltage (internal 1.8V) for output as intermediate output voltage (LV18), and this sequence continues until the power safe signal is asserted at step 406.

Once the power safe signal (Power OK) is asserted (affirmative outcome to decision 406), this indicates that the external rails are safe and powered up. At this point, the external 1.8V rail may be used at the circuit area, and the temporary power supply voltage and temporary 1.8V generator may be disabled at step 412. In selected embodiments, the assertion of the power safe signal (Power OK) causes the temporary voltage generator to drive the temporary 3.3V supply voltage LOW, thereby disabling the temporary intermediate voltage generator. The assertion of the power safe signal (Power OK) also controls the multiplexer to select the (now safe) external 1.8V voltage for output as intermediate output voltage (LV18). As a result, the output signal LV18 is safe and reliable to use with the external 3.3V in powering circuits at the pad. And once the power signal is asserted to disables the temporary intermediate voltage generator from consuming current, the architecture of the power up biasing circuit minimizes power consumption while allowing external powers to come up in any order. At step 414, the process ends.

As described herein, selected aspects of the invention as disclosed above may be implemented in hardware or software. For example, selected aspects of the embodiments described above may be implemented as functionality programmed into any of a variety of circuitry, including but not limited to multiplexer circuits, voltage generator circuits, power supply circuits, power control circuits, which are controlled by one or more power safe signals which are generated by control modules, circuits, and/or hardware in response to power-up conditions at different voltage rails. Furthermore, aspects of the embodiments may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies such as complementary metal-oxide semiconductor (CMOS), bipolar technologies such as emitter-coupled logic (ECL), polymer technologies (e.g., silicon-conjugated polymer and metal-conjugated polymer-metal structures), mixed analog and digital, etc. Thus, some portions of the detailed descriptions herein are consequently presented in terms of a hardware-implemented process and some portions of the detailed descriptions herein are consequently presented in terms of a software-implemented process involving symbolic representations of operations on data bits within a memory of a computing system or computing device. Generally speaking, computer hardware is the physical part of a computer, including its digital circuitry, as distinguished from the computer software that executes within the hardware. The hardware of a computer is infrequently changed, in comparison with software and hardware data, which are "soft" in the sense that they are readily created, modified or erased on the computer. These descriptions and representations are the means used by those in the art to convey most effectively the substance of their work to others skilled in the art using both hardware and software. Hardware embodiments of the invention may be fabricated based upon software code (e.g., Verilog, HDL, RTL or GDSII data) that is used to configure (e.g. through specific maskworks) a fabrication facility so as to manufacture a device embodying aspects of the present invention.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. An apparatus for powering an electronic circuit, comprising:
    a first temporary voltage generator for generating a temporary supply voltage when a power safe signal indicates that one or more external power supply rails are not powered up; and
    a second temporary voltage generator for generating an intermediate output voltage by:
    selecting an intermediate voltage generated by an intermediate voltage generator that is powered by the temporary supply voltage only when the power safe signal indicates that one or more external power supply rails are not powered up, and
    selecting an external intermediate voltage when the power safe signal indicates that the one or more external power supply rails are powered up.

2. The apparatus of claim 1, where the intermediate voltage orator is powered down when the power safe signal indicates that the one or more external power supply rails are powered up.

3. The apparatus of claim 1, where the temporary supply voltage is distributed to a plurality of pads.

4. The apparatus of claim 1, where the first temporary voltage generator comprises:
    an intermediate voltage generator that is powered by an external supply voltage to generate a first intermediate voltage; and
    a control multiplexer circuit controlled by the power safe signal to generate the temporary supply voltage from the first intermediate voltage only when the power safe signal indicates that one or more external power supply rails are not powered up.

5. The apparatus of claim 4, where the intermediate voltage generator comprises a resistor divider network connected between an external supply voltage rail and a ground voltage rail to generate an intermediate voltage at an output node of the resistor divider network that is powered by an external supply volt to generate the first intermediate voltage.

6. The apparatus of claim 5, where the control multiplexer circuit comprises one or more control multiplexer circuits controlled by the power safe signal and connected to selectively pass the first intermediate voltage to control a cascoded pass-gate for generating the temporary supply voltage only when the power safe signal indicates that one or more external power supply rails are not powered up.

7. The apparatus of claim 5, where the control multiplexer circuit comprises:
    a cascoded pass-gate comprising first and second pass-gate transistors connected in series between the external supply voltage rail and a temporary supply voltage output pad;
    a first control multiplexer controlled by the power safe signal and connected to selectively pass the intermediate voltage and the external supply voltage rail to control the first pass-gate transistor; and
    a second control multiplexer controlled by the power safe signal and connected to selectively pass the intermediate voltage and an external intermediate voltage rail to control the second pass-gate transistor.

8. The apparatus of claim 1, where the second temporary voltage generator comprises:
    a resistor divider network connected between the temporary supply voltage and a ground voltage rail to generate an intermediate voltage at an output node of the resistor divider network only when the power safe signal indicates that one or more external power supply rails are not powered up.

9. A method for biasing a split power supply based circuit during power up comprising:
    generating a temporary supply voltage which is high when a first power signal indicates that one or more external power supply rails are not powered up, and which is low when the first power signal indicates all external power supply rails are powered up;
    generating an intermediate output voltage by powering an intermediate voltage generator with the temporary supply voltage to generate the intermediate output voltage when the first power signal indicates that one or more external power supply rails are not powered up, and by providing an external intermediate voltage as the intermediate output voltage and powering down the intermediate voltage generator when the first power signal indicates that all of the one or more external power supply rails are powered up.

10. The method of claim 9, where powering down the intermediate voltage generator comprises powering the intermediate voltage generator when the temporary supply voltage is low.

11. The method of claim 9, further comprising distributing the temporary supply voltage to a plurality of pads at a plurality of circuit areas.

12. The method of claim 9, where generating the temporary supply voltage comprises:
   generating an internal intermediate voltage by powering an internal intermediate voltage generator with a supply voltage to generate the internal intermediate voltage; and
   producing one or more control signals to generate the temporary supply voltage from the internal intermediate voltage only when the first power signal indicates that one or more external power supply rails are not powered up.

13. The method of claim 12, where generating the internal intermediate voltage comprises powering a resistor divider network with an external supply voltage to generate the internal intermediate voltage at an output node of the resistor divider network.

14. The method of claim 12, where producing one or more control signals comprises:
   applying the first power signal as a select signal to the one or more control multiplexer circuits connected to selectively pass the internal intermediate voltage to control a cascoded pass-gate for generating the temporary supply voltage only when the first power signal indicates that one or more external power supply rails are not powered up.

15. The method of claim 14, where each of the one or more control multiplexer circuits comprises:
   a cascoded pass-gate comprising first and second pass-gate transistors connected in series between the external supply voltage rail and a temporary supply voltage output pad;
   a first control multiplexer controlled by the first power signal and connected to selectively pass the internal intermediate voltage or the external supply voltage to control the first pass-gate transistor; and
   a second control multiplexer controlled by the first power signal and connected to selectively pass the internal intermediate voltage or an external intermediate voltage to control the second pass-gate transistor.

16. The method of claim where the generating the intermediate output voltage comprises powering a resistor divider network with the temporary supply voltage to generate a first intermediate voltage at an output node of the resistor divider network only when the first power signal indicates that one or more external power supply rails are not powered up.

17. The method of claim 16, further comprising applying the first power signal as a select signal to a control multiplexer circuit connected to selectively pass the first intermediate voltage or an external intermediate voltage as the intermediate output voltage.

18. A power up biasing circuit for a split power supply integrated circuit comprising:
   a first voltage generator for generating a temporary first reference voltage that is shared by a plurality of circuit areas when a power safe signal indicates that one or more external power rails are not powered up; and
   a second voltage generator in each of the plurality of circuit areas for generating a second reference voltage from the temporary first reference voltage when the power safe signal indicates that one or more external power rails are not powered up, and for generating the second reference voltage from an external reference voltage when the power safe signal indicates that all of the one or more external power rails are powered up.

19. The power up biasing circuit of claim 18, where the first voltage generator comprises:
   a resistor divider network connected to be powered by an external supply rail to generate an internal intermediate voltage at an output node of the resistor divider network;
   a cascoded pass-gate comprising first and second pass-gate transistors connected in series between the external supply rail and a temporary reference voltage output pad;
   a first control multiplexer controlled by the power safe signal and connected to selectively pass the internal intermediate voltage or an external supply voltage to control the first pass-gate transistor; and
   a second control multiplexer controlled by the power safe signal and connected to selectively pass the internal intermediate voltage or an external intermediate voltage to control the second pass-gate transistor.

20. The power up biasing circuit of claim 18, where each second voltage generator comprises:
   a resistor divider network connected to be powered by the temporary first reference voltage to generate an internal intermediate voltage at an output node of the resistor divider network; and
   a control multiplexer controlled by the power safe signal and connected to selectively pass the internal intermediate voltage or an external intermediate voltage for output as the second reference voltage.

* * * * *

UNITED STATES PATENT AND TRADEMARK OFFICE
CERTIFICATE OF CORRECTION

| | |
|---|---|
| PATENT NO. | : 8,896,147 B2 |
| APPLICATION NO. | : 13/336503 |
| DATED | : November 25, 2014 |
| INVENTOR(S) | : Mangattur et al. |

It is certified that error appears in the above-identified patent and that said Letters Patent is hereby corrected as shown below:

IN THE CLAIMS

Claim 2, column 7, line 61, change "orator" to -- generator --.

Claim 5, column 8, line 14, change "volt" to -- voltage --.

Claim 16, column 9, line 40, after "claim" insert -- 9, --.

Signed and Sealed this
Sixteenth Day of June, 2015

Michelle K. Lee
*Director of the United States Patent and Trademark Office*